May 31, 1966  T. T. WILKINSON  3,253,515
FLUID ACTUATED MOTOR

Filed March 16, 1962  3 Sheets-Sheet 1

INVENTOR.
THURLAND T. WILKINSON
BY
Adams, Forward and McLean
ATTORNEYS

May 31, 1966     T. T. WILKINSON     3,253,515
FLUID ACTUATED MOTOR

Filed March 16, 1962     3 Sheets-Sheet 3

INVENTOR.
THURLAND T. WILKINSON
BY
Adams, Forward and McLean
ATTORNEYS

3,253,515
FLUID ACTUATED MOTOR
Thurland Thompson Wilkinson, Princeton, N.J., assignor, by mesne assignments, to Sinclair Research, Inc., New York, N.Y., a corporation of Delaware
Filed Mar. 16, 1962, Ser. No. 183,320
2 Claims. (Cl. 91—401)

This application is a continuation-in-part of Serial No. 117,912, filed June 19, 1961, now abandoned.

My invention relates to actuation of remotely located devices and in particular provides a fluid actuated motor.

In large oil tankers the piping to the various cargo tanks extends through such tanks, and the valves provided to communicate the pumping systems with the individual cargo tanks and the valves interconnecting the several pumping systems are located near the bottom of the cargo tanks. Similarly, valves are also found near the bottom of the ballast tanks. In a typical 50,000 ton tanker 156 such submerged valves can be found.

Although some recently commissioned tankers are provided with automated valve control systems, in most cases the cargo and ballast valves are controlled from the deck by means of reach rods extending through the tanks in which the valves are located. Generally, automated valve control has been avoided, partly at least for the reason that the location of the valves renders service of any automatic valve actuator difficult and for the reason that, since the actuator must be submerged, relatively expensive equipment is required to avoid the possible accumulation of moisture, sludge and other foreign matter which might be forced into the actuator under the pressure head of the cargo or ballast above it.

It is thus a principal object of my invention to provide an automatic valve actuator suitable for use under submerged conditions.

It is also an object of my invention to provide such a valve actuator having relatively simple construction which can be inexpensively fabricated.

It is still another object of my invention to provide such a valve actuator which can be readily operated at a low air pressure in the ordinary deck compressed air supply of a tank vessel without the need of filtering or drying the air. It will be apparent, however, that the valve actuator of my invention can also be used with relatively simple hydraulic systems, and can even be operated off the various water systems normally found on tank vessels.

It is a further object of my invention to provide such a valve actuator in which rather than avoiding the accumulation of moisture, sludge and other foreign matter, the valve actuator is provided with a self scavenging arrangement. It will thus be apparent that in the valve actuator of my invention it is unnecessary to hold fluid pressure on the actuating system during periods in which it is inoperative.

Although the principal object of my invention is directed to submerged valve actuation, it will be apparent from the description hereinafter that the device of my invention can be utilized other than under submerged conditions, for example on the deck of a tank vessel and in void spaces, and that it can be used for actuating devices other than valves.

Basically, the device of my invention is a fluid motor in which a pressuring fluid can be admitted to either of a pair of variable volume chambers having volume varying elements, i.e., driven members, which are connected to move in synchronism such that the maximum position of one occurs at the minimum of the other and vice versa. An exhaust port arrangement is provided communicating with each of the variable volume chambers to exhaust such chamber at its maximum volume position. Fluid conduit means for admitting the pressurizing fluid to the variable volume chambers are connected to each of the chambers, at a position preferably remote from the exhaust port connection. A mechanical linkage can also be attached to the driven members to transmit the movement of the driven members to actuate a valve or the like. Thus at the end of each stroke, as the pressuring fluid drives the driven members to a position of maximum volume of the chamber to which the fluid is admitted, the exhaust port in such chamber opens and the fluid sweeps the chamber clean.

The pair of variable volume chambers of the device of my invention can be two completely separate chambers or they can "overlap," i.e. the driven members can function to divide a single large chamber of fixed volume into a pair of variable volume chambers such that a portion of the wall defining the single large chamber is common to both variable volume chambers as each variable volume chamber alternately approaches its maximum volume.

Thus, in one application of my invention the fluid motor can be of the piston and cylinder type in which the pressuring fluid is admitted to each end of the cylinder to drive the piston back and forth within the cylinder, and the piston rod can be utilized to drive the valve or other devices to be actuated. Alternately, and of particular advantage where rotary motion is required, the fluid motors can be chambers of sectoral shape having oscillating vanes. Such a construction is also amenable to construction in one housing of sectoral shape having a single vane traveling back and forth between the radial ends of the housing into which appropriate fluid connections are provided for alternately pressuring each side of the vane.

While single acting motors connected in tandem can advantageously be employed in my invention it will be apparent that under most circumstances the double acting arrangement is preferred at least in part because of its more simple construction. In the double action arrangement, unlike the tandem, single acting arrangement, a single exhaust port can be utilized for both variable volume chambers by limiting the stroke of the piston, vane or other driven member or by increasing its thickness in the direction of stroke such that only a limited portion of the side wall is passed by each end of the piston, vane or other driven member and hence is common to both variable volume chambers. An exhaust port located in such portion will thus be uncovered by the driven member as it approaches the end of each stroke to communicate the exhaust port with that variable volume chamber approaching its maximum volume and into which the pressuring fluid is then being admitted.

In a further embodiment of my invention the driven or movable member can be in the form of a hub or rotor mounted for oscillation about its axis and having two diametrically extending vanes. This driven or movable member is positioned within a hollow body having an interior chamber of cylindrical shape. In this particular embodiment the ends of the vanes remote from the rotor are in fluid tight sliding contact with the walls of the interior chamber.

While the pressuring fluid can be simply exhausted from the cylinder or sector chamber, where the cylinder and piston or chamber and vane are operated under submerged conditions, some escape line is preferably provided for the pressuring fluid. Alternately to or in addition to such an escape line, a pressure relief valve can be provided at each of the exhaust ports to operate at a predetermined pressure below full actuating fluid operating pressure. Thus after completion of a stroke of the piston or vane, the operating pressure can be reduced below such predetermined pressure to lock the piston or vane in position. It will be apparent also that if an exhaust line is used, this line can be carried back to the point of control and be caused to perform indicating functions. In the situation discussed above in which two exhaust ports are employed and each is connected to the pressuring fluid line of the chamber other than that to be exhausted, it will be noted the need of a separate exhaust line is obviated. The two lines required thus alternate in function as fluid supply and exhaust lines.

For a more complete understanding of the practical application of my invention, reference is made to the appended drawings in which.

Figure 1:
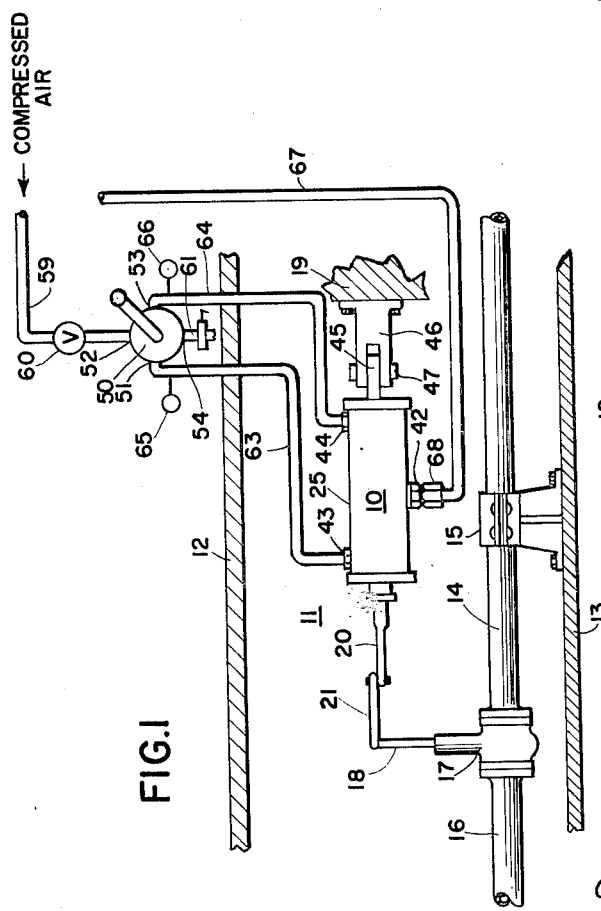
FIGURE 1 is a somewhat schematic elevation of a valve control system utilizing one embodiment of the valve actuator of my invention.

Referring now to FIGURE 1, a valve actuator in accordance with my invention is designated by the reference number 10 and is installed in the cargo space 11 of a cargo tank in a tank vessel having a deck 12. At the bottom 13 of the cargo tank enclosing cargo space 11, a pipe 14 forming a part of the pumping system of the tank vessel is mounted in horizontal position supported by an upright bracket 15. Pipe 14 is connected to a second pipe 16 through a valve 17 also located near the bottom of cargo space 11, and which is provided with an upright valve stem 18, which in the particular valve 17 in question is rotatably operated through a 90° angle between fully open and fully closed positions. Actuator 10 is mounted on a portion of side wall 19 of the tank enclosing cargo space 11, and has its operating element 20 pivotally connected to a crank 21 affixed on the upper end of valve stem 18.

Figure 2:
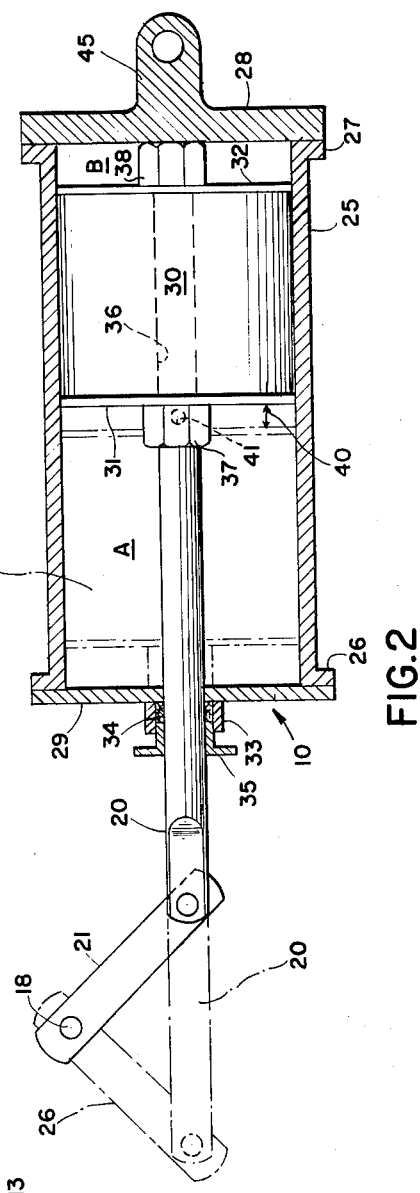
FIGURE 2 is an enlarged plan section of the valve actuator shown in FIGURE 1.

Referring more particularly to FIGURE 2, valve actuator 10 is constructed of a smooth bored cylindrical casing 25 having flanged ends 26 and 27, and which as can be seen in FIGURE 1 is mounted with its axis extending in a horizontal direction. On flanged end 27 there is mounted an end cap 28, which is bolted or welded to end 27, while end 26 of cylinder 25 is provided with an end cap 29 which is similarly bolted or welded to end 26. Thus the side wall of cylinder 25 and end walls formed by end caps 28 and 29 enclose a cylindrical chamber in which a cylindrical piston 30 is mounted with its cylindrical side in sliding, fluid tight contact with the interior of the side wall of cylinder 25 separating within cylinder 25 a pair of variable volume sub-chambers A and B, the former being confined between cap 29 and an end face 31 of piston 30 and the latter being confined between cap 28 and the other end face 32 of piston 30. The cylindrical side of piston 30 preferably is provided with sealing rings or the like to insure a smooth, relatively frictionless, sliding and fluid tight fit between piston 30 and cylinder 25.

End cap 29 is centrally apertured around which aperture is provided a bushing 33 through which operating element 20, i.e., a piston rod, extends axially into cylinder 25. Suitably, packing 34 is mounted about rod 20 within bushing 33, and a gland 35, threadedly received in bushing 33 is provided to compress packing 34 forming a fluid tight seal about rod 20 as it enters cylinder 25 through plate 29. Piston 30 is provided with an axial bore 36 through which the interior end of rod 20 extends and is retained by nuts 37 and 38, threadedly received on the interior end of rod 20 and tightened against end faces 31 and 32, respectively, of piston 30. Suitably washers or the like are provided underneath nuts 37 and 38 to prevent fluid communication between chambers A and B through bore 36.

It will be observed, referring particularly to FIGURE 2, that piston 30 can move within the side wall of cylinder 25 between a first position (shown in solid lines, right end of FIGURE 2) and a second position (shown in dashed lines, left end of FIGURE 2) limited, respectively, by the butting of nut 38 and the end of rod 20 against the end wall of actuator 10 formed by cap 28 and by the butting of nut 37 against the end wall of actuator 10 formed by cap 29. It will be further observed that the path of travel of piston 30 between such two positions is slightly greater than the length of piston 30 in contact with the side wall of cylinder 25, such that a small central portion of the side wall of cylinder 25, designated by the reference numeral 40, is alternately common to chambers A and B as piston 30 moves between its two limiting positions in cylinder 25. A port 41 is provided in that portion of the side wall of cylinder 25 denoted by the reference numeral 40, and is exteriorly provided with a fitting 42 (see FIGURE 1). Also referring to FIGURE 1, the end clearances in chambers A and B are respectively provided with similar ports and inlet fittings 43 and 44. Fitting 42 is on the under side of cylinders 25, while fittings 43 and 44 are on its upper side.

End cap 28 is exteriorly provided with a boss 45 having horizontal flat sides which is vertically apertured and mounted in a clevis 46 secured to the side 19 of the tank enclosing cargo space 11. A pin 47 extends through said aperture and is affixed to the ends of clevis 46 to permit actuator 10 to oscillate in a horizontal plane. Thus as piston 30 strokes back and forth in cylinder 25, piston rod 20 oscillates crank 21 and valve stem 18 to open and close valve 17.

Figure 3:
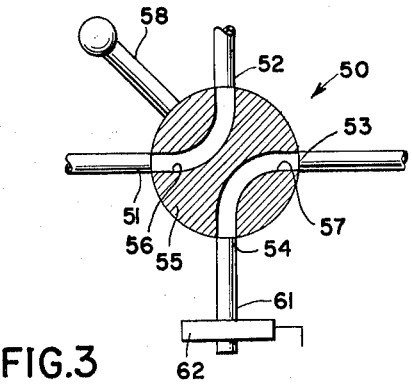
FIGURE 3 is an enlarged fragmentary view of a portion of the system shown in FIGURE 1.
Figure 4:
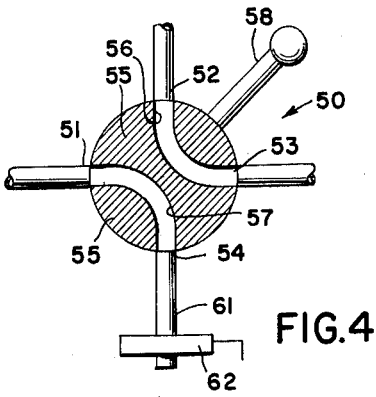
FIGURE 4 is a view similar to FIGURE 3 of the same portion of FIGURE 1 showing a different operative position of such portion.

The fluid control system for operating actuator 10 includes a four-way valve 50 mounted on a suitable control panel located above deck or at some other convenient spot. Valve 50 referring more particularly to FIGURES 3 and 4 is provided with four ports 51, 52, 53 and 54, disposed at 90° angles about a rotatable cock 55 containing two separate curved bores 56 and 57. Bores 56 and 57 are so disposed that their openings from the side of cock 55 are at about 90° intervals about cock 55 which is also provided with a crank 58 permitting cock 55 to be rotated between a first position in which the openings of bore 56 register with ports 51 and 52, connecting these, and a second position in which the openings of bore 56 register with ports 52 and 53, connecting these. Similarly, the openings from bore 57 in the first position of cock 55 register with ports 53 and 54, and in the second position of cock 55 register with ports 51 and 54.

A connection 59 from the tank vessel compressed air supply is made to port 52 of valve 50 through a pressure reducing valve 60. An exhaust connection 61, which may include a stop cock 62, is made to port 54 of valve 50. A conduit 63 is connected to port 51 of valve 50 and leads to and is connected to inlet fitting 43 of actuator 10. A second conduit 64, which is connected to port 53, similarly leads to and is connected to inlet fitting 44 of actuator 10. Each of conduits 63 and 64 at the control panel at which valve 50 is located are provided with pressure gauges 65 and 66, respectively, and in the vicinity of actuator 10 must be of flexible construction to accommodate the slight oscillation of actuator 10 during operation.

A third conduit 67, which is also desirably flexible in the vicinity of actuator 10, is connected to exhaust fitting 42 of actuator 10 through a pressure relief valve 68. Valve 68 is oriented to open upon the pressure in cylinder 25 exceeding a predetermined value, assuming piston 30 is not blocking port 41. The end of conduit 67 remote from actuator 10, desirably is brought to the control panel at which valve 50 is located and is vented at that location. A whistle or other sounding device can be employed to indicate a venting condition of conduit 67.

In operation, assuming piston 30 is in a position at the limit of its path of travel toward end cap 28 (as shown in FIGURE 2), assuming that the corresponding position of valve 17 is a closed position of such valve, assuming that pressure reducing valve 60 is set to reduce the compressed air pressure at port 52 to a valve somewhat in excess of the operating pressure required to open relief valve 68 and assuming that the position of crank 58 is that shown in FIGURE 3, valve 17 is opened by throwing crank 58 to its other position, that shown in FIGURE 4, thus throwing pressure on conduit 64 and relieving pressure on conduit 63 by connecting conduit 63 to exhaust fitting 61. The compressed air thus is connected to chamber B of actuator 10 driving piston 30 to the opposite end of cylinder 25 (toward end cap 29) and throws valve 17 from its closed to open position.

As piston 30 butts against end cap 29, port 41 communicates with chamber B allowing the pressuring air to actuate relief valve 68 and vent through conduit 67. The hissing of the venting air or operation of any device utilized to indicate the venting condition assures the operator that the valve is opened. If it is desired to lock actuator 10 in this position, pressure reducing valve 60 can be throttled down to a lower pressure (indicated on gauge 66) than that required to actuate valve 68, permitting it to close while still holding pressure on piston 30 to insure that the valve remains open.

It will be apparent that valve 17 is closed by the reverse operation, that is, by setting pressure reducing valve 60 up to a point which will actuate valve 68 and throwing crank 58 to the position shown in FIGURE 3, placing the pressure on conduit 63 and exhausting conduit 64. Piston 30 thereupon drives toward end cap 28, at the end of its travel communicating port 41 with chamber A to operate valve 68 and repeat the venting condition of conduit 67.

It will be noted that where, as illustrated with reference to FIGURE 1, actuator 10 is submerged in liquid, a leak into cylinder 25 will not materially affect the operation of the system because of the scavenging of cylinder 10 by the actuating fluid at the end of each stroke. The operator, moreover, will be advised of such leak by the venting discharge of conduit 67 at the control panel.

Figure 5:
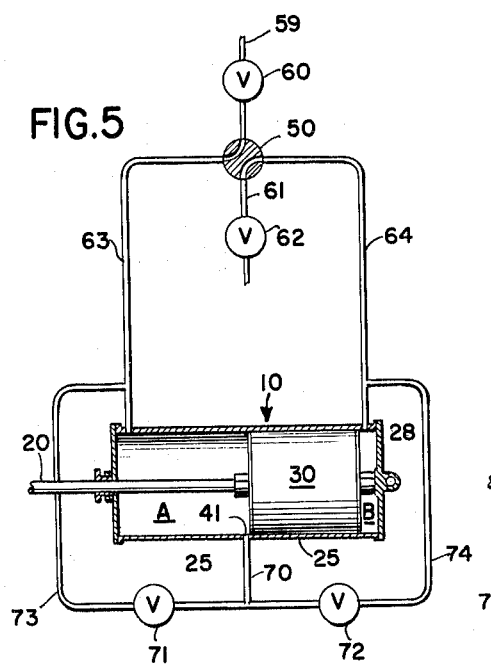
FIGURE 5 is a schematic diagram of another control system of utilizing the embodiment of my invention shown in FIGURE 1.

An alternate arrangement is illustrated with reference to FIGURE 5, in which the same reference numerals have been used to indicate parts which correspond to those shown in FIGURE 1. In the arrangement of FIGURE 5, pressure relief valve 68 and conduit 67 are omitted and the leg of a T-fitting 70 is connected to port 41. The arms of T-fitting 70 are connected through two pressure relief valves 71 and 72 to conduits 63 and 64. Thus one arm of T-fitting 70 is connected through valve 71 and a conduit 73 to conduit 63, and other arm of T-fitting 70 is connected through valve 72 and a conduit 74 to conduit 64. In this arrangement operation is the same as before, valves 71 and 72 being set to operate at a lower pressure than the pressure supply on the discharge side of pressure reducing valve 60. The venting of lines 73 and 74 is through lines 63 and 64 and exhaust fitting 61, thus when piston 30 is in a position adjacent end plate 28, the pressure on line 63 is also on line 73 and valve 71 does not operate. Valve 72, however, is operated, venting chamber A through conduits 74 and 64 and exhaust fitting 61. In this arrangement of FIGURE 5, the principal advantage lies in the elimination of a long third conduit 67, as conduits 73 and 74 can be made relatively short and actually can fit immediately about cylinder 25.

The systems described in FIGURES 1 and 5 can readily be modified to accommodate a closed hydraulic system. Thus, for example, referring to FIGURE 6, the system of FIGURE 5 is so modified by connecting supply line 59 to the outlet side of an accumulator 80, the inlet side of which is connected by a conduit 81 to the discharge side of an air operated hydraulic pump 82. Exhaust fitting 61 is connected through stop cock 62 and a conduit 83 to discharge into a sump tank 84, the drain of which is connected to a conduit 85 leading to the suction side of pump 82. Operation is similar to that described with respect to FIGURE 5 except that the system is closed and operated with a hydraulic fluid rather than compressed air. Since actuator 10 is self scavenging only simple measures are necessary to clarify the hydraulic fluid.

In the actuator of my invention, it will be noted that with reference to a typical valve 17, such as is used in a normal tank vessel, about 4¾ inches of stroke at about 900 pounds thrust are required to operate the valve. This can be accomplished using 3½ inch inside diameter cylinder operated at 100 pounds per square inch pressure. These requirements are met using typical compressed air supply available on tank vessel or by relatively simple low pressure hydraulic units.

It is preferred, however, that a separate exhaust port be employed for each variable volume chamber, even in the double acting arrangement, to minimize the size of the driven member, to obtain a maximum stroke for a given volume and to limit exhaust to the very end of the stroke of the driven member. To this end I prefer to provide the exhaust port at a position in the side wall of the housing containing the pair of variable volume chambers adjacent each end of the side wall relative to the stroke of the driven member such that each exhaust port is uncovered by the driven member to communicate the exhaust port with that variable volume chamber approaching maximum volume at or shortly prior to the end of the stroke of the driven member. This arrangement is made feasible, even though the exhaust port for most positions of the driven member is actually communicated with the "wrong" variable volume chamber, by the simple expedient of connecting the exhaust port for one variable volume chamber to the pressuring fluid inlet conduit for the other chamber through a check valve.

Figure 6:
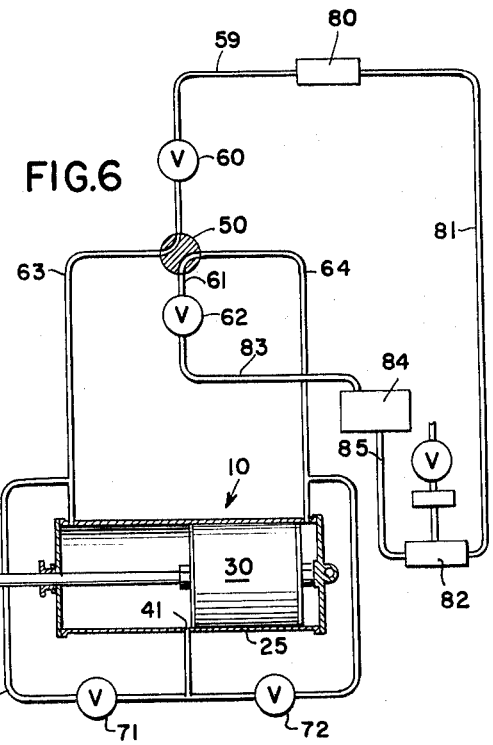
FIGURE 6 is a schematic diagram of still another control system utilizing the embodiment of my invention shown in FIGURE 1.
Figure 7:
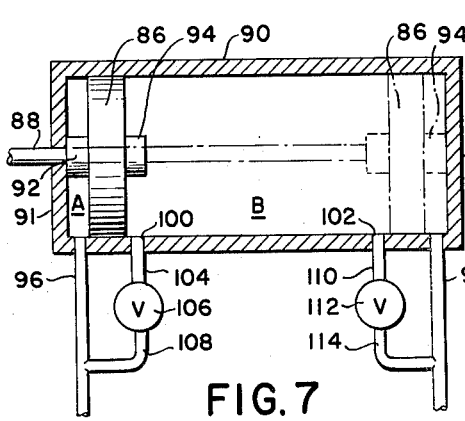
FIGURE 7 is a sectional view of another embodiment of the valve actuator of my invention.

In FIGURE 7, another valve actuator in accordance with my invention is illustrated in which a piston 86 is mounted on piston rod 88 for reciprocation within hollow cylinder 90. Piston 86 is affixed to piston rod 88 by means of nuts 92 and 94. The piston 86 is movable between a first position, shown in solid lines (left in FIGURE 7), and a second position, shown in dashed lines (right in FIGURE 7). As can be seen from FIGURE 7, the travel of piston 86 is limited in the first position when nut 92 abuts one end wall 91 of cylinder 90 and the travel of piston 86 is limited in its second position when nut 94 and rod 88 abut the other end wall 93 of cylinder 90. As opposed to the valve actuator 10 shown in FIGURES 1, 2, 5 and 6, it will be observed that the path of travel of piston 86 of the valve actuator shown in FIGURE 7 between its first and second positions is substantially greater than the length of piston 86 in contact with the side wall of cylinder 90. It will further be observed that piston 86 separates the volume within cylinder 90 into a pair of variable volume subchambers A and B, the former being confined between end wall 91 and piston 86 and the latter being confined between end wall 93 and piston 86. Thus, a major central portion of the side wall of cylinder 90 is alternately common to chambers A and B as piston 86 moves between its two limiting positions within cylinder 90.

As can also be seen in FIGURE 7, a fluid conduit 96 is connected to communicate with the interior of cylinder 90 at a point near end wall 91 thereof such that it is at all times in communication with chamber A. Similarly, another conduit 98 also is connected to communicate with the interior of cylinder 90 near end wall 91 thereof such that it is at all times in communication with chamber B.

Cylinder 90 is also provided with a pair of ports 100 and 102 positioned adjacent conduits 96 and 98, respectively. Ports 100 and 102 are further located in the side wall of cylinder 90 such that port 100 communicates with chamber B when chamber B is at its maximum volume and port 102 communicates with chamber A when it is at its maximum volume. In this construction of the valve actuator of my invention, port 100 is serially connected through a conduit 104, a pressure relief valve 106 and a conduit 108 to conduit 96, while port 102 is serially connected through a conduit 110, a pressure relief valve 112 and a conduit 114 to conduit 98. Relief valves 106 and 112 are normally closed and are operated to open position by a predetermined increase in pressure in conduits 104 and 110, respectively, above the pressure in conduits 108 and 114, respectively. The operating pressure for valves 106 and 112 should be less than the pressure available to conduits 96 and 98 for operating piston 86.

In the arrangement of FIGURE 7 an operating circuit such as shown in FIGURE 5 or FIGURE 6 is preferably utilized, conduits 96 and 98 corresponding respectively to conduits 63 and 64 in those figures. Assuming piston 86 is dead (no pressure on lines 96 and 98) in a position adjacent end wall 91, as shown in solid lines in FIGURE 7, both valves 106 and 112 will be closed by reason of the lack of any pressure in conduits 96 and 98. If it is desired to shift the position of a valve or other device connected to piston rod 88, operating pressure from the compressed air supply is applied to conduit 96 wihch communicates with chamber A in the end clearance in cylinder 90 adjacent end wall 91, and conduit 98 is connected to exhaust to the atmosphere. Although the pressure differential across valve 106 at this point is greater than the operating pressure of the valve, it is in the wrong direction, and valve 106 remains closed. Hence piston 86 is driven toward end wall 93 of cylinder 90 by the pressure differences between chambers A and B. Since conduit 98 is connected to an exhaust outlet, as piston 86 passes port 102 at the completion of its stroke, as shown in dashed lines in FIGURE 7, port 102 is communicated with chamber A applying a pressure differential in the correct direction across valve 112 to operate valve 112 and exhaust chamber A through exhaust conduit 98. As before such exhaust action sweeps the chamber clean of any accumulated foreign matter. At the same time the exhaust gases can be utilized to indicate to the operator that the valve has been operated. Reverse operation obviously utilizes port 100 as the exhaust port and in other respects is as described above.

Figure 8:
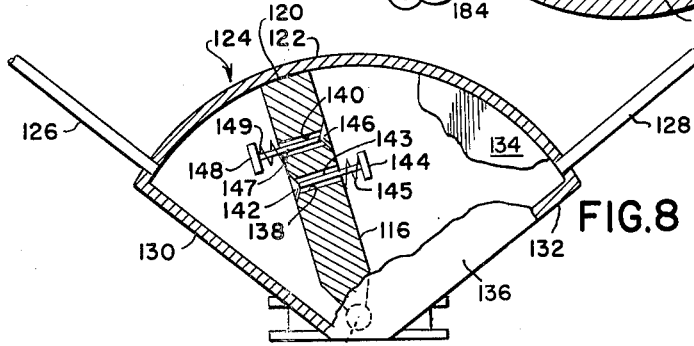
FIGURE 8 is a plan view, partially broken away of yet another embodiment of the valve actuator of my invention.

FIGURE 8 illustrates another valve actuator in accordance with my invention in which a vane 116 is mounted on an axle or shaft 118 at one of its ends to oscillate about such end within a generally sectoral closed housing 124 having a pair of end walls 130 and 132 which intersect at approximately a right angle and an arcuate wall 122 connecting the non-intersecting ends of walls 130 and 132. Vane 116 is positioned with axle 118 journaled in the sectoral sides 134 and 136 of housing 124 adjacent the intersection of end walls 130 and 132, to oscillate between a position adjacent end wall 130 and a position adjacent end wall 132 in fluid-tight sliding contact with the sectoral sides 134 and 136 of housing 124 and with its end 120 remote from end 118 in similar contact with arcuate wall 122, thereby dividing the sectoral chamber 124 into a pair of variable volume sub-chambers. The vane 116 is adapted to oscillate between such positions through an arc of approximately 90°, and one end of axle 118 is extended through sectoral side 134 of housing 124 with a fluid tight seal to permit connection of axle 118 to the device to be actuated.

Fluid conduits 126 and 128 communicate with the interior of sectoral chamber 124 through the end clearances in arcuate wall 122 adjacent end walls 130 and 132, respectively. Thus, fluid conduit 126 communicates at all times with only one of the variable volume sub-chambers, while fluid conduit 128 communicates at all times only with the other variable volume sub-chamber. Vane 116 is centrally provided with a pair of ports 138 and 140, each of which extends through vane 116 from one side to the other communicating the two variable volume chambers. Port 138 is provided with a valving device including a valve head 142 seated over port 138 on the side of vane 116 facing end wall 130 and a valve rod 143 extending through and terminating beyond port 138 in a follower 144. A coil spring 145 is disposed intermediate follower 144 and the side of vane 116 facing end wall 132 for biasing valve head 142 to remain closed over port 138. Similarly, port 140 is provided with a valving device including a valve head 146 seated over port 140 on the side of vane 116 facing end wall 132 and a valve stem 147 extending through and terminating beyond port 140 in a follower 148. A coil spring 149 is disposed intermediate follower 148 and the side of vane 116 facing end wall 130 for biasing the valve head 146 to remain closed over port 140.

In operation the actuator of FIGURE 8 is used with a pneumatic circuit, such as is shown in FIGURE 5, with, however, conduits 70, 73 and 74 omitted as there are only two fluid connections to the actuator, namely conduits 126 and 128 which in the circuit of FIGURE 5 correspond to conduits 63 and 64. Air pressure delivered through conduit 126, for example, causes vane 116 to oscillate clockwise until follower 144 strikes end wall 132. Continued movement of vane 116 then causes valve head 142 to lift off port 138 exhausting the variable volume chamber to the left of vane 116, as seen in FIGURE 8, through conduit 128 to sweep such variable volume chamber clean of any accumulated foreign material. Coil spring 145 should be under weak tension sufficient to close valve head 142 only after vane 116 has been moved to the right by pressuring conduit 128. It will be obvious that the operation in the reverse direction is comparable. The actuator of FIGURE 8 since its omits pressure relief valves, such as valves 106 and 112 in the actuator of FIGURE 7, can be used only to actuate devices which when actuated to a given position will remain in that position without further or continued actuator operation.

Figure 9:
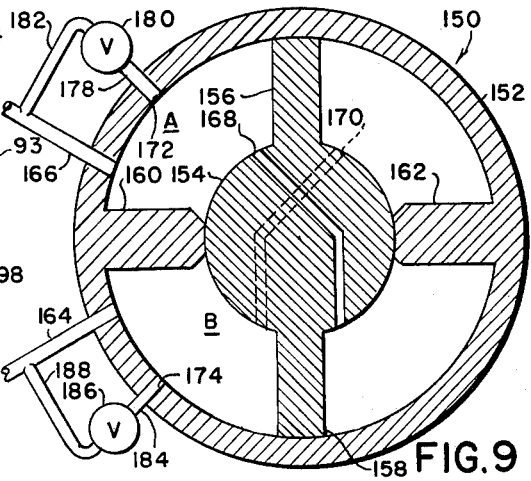
FIGURE 9 is a schematic representation of another embodiment of my invention.

In FIGURE 9 is illustrated yet another actuator which is constructed in accordance with my invention. In the actuator shown in FIGURE 9, the reference numeral 150 denotes a closed, cylindrical housing. Located centrally within housing 150 is a rotor 154 journaled at its ends in the ends of housing 150. Rotor 154 is provided along its length with diametrically opposite vanes 156 and 158 extending to the inside surface of the cylindrical side wall 152 of housing 150. Such side wall is internally provided with a pair of diametrically opposite stationary shoes or stops 160 and 162 extending across the chamber from wall 152 to rotor 154. The ends of shoes 160 and 162 remote from wall 152 are maintained in sliding, sealing contact with rotor 154. Thus, the annular area defined between wall 152 and rotor 154 is divided into two parts A and B such that vane 156 oscillates in part A of the annular chamber while vane 158 oscillates in part B of the annular chamber. Each of the chamber parts A and B is further partitioned by vanes 156 and 158. A fluid conduit 164 communicates with the interior of part B of the chamber through wall 152 adjacent shoe 160. Another fluid conduit 166 communicates with the interior of part A of the chamber through wall 152 also adjacent shoe 160. The portions of the two parts of the chamber which are partitioned by vanes 156 and 158 are interconnected on opposite sides of the vanes by cross over ports 168 and 170 extending through rotor 154. Thus, fluid communication is provided from conduit 164 through the portion of part B of the chamber defined by vane 158 and shoe 160, and cross over port 170 to the portion of part A of the chamber defined by vane 156 and shoe 162. Similarly, fluid communication is provided from conduit 166 through the portion of part A of the chamber defined by vane 156 and shoe 160, and cross over port 168 to the portion of part B of the chamber defined by vane 158 and shoe 162. Through this arrangement pressure is exerted on the reverse sides of opposite vanes to turn the rotor with balanced torque in either direction.

In accordance with my invention, the actuator of FIGURE 9 is further provided with a port 172 in side wall 152 located adjacent conduit 166 and communicating with chamber part A and with a port 174 in side wall 152 located adjacent conduit 164 and communicating with chamber part B. While the positions where conduits 164 and 166 enter side wall 152 are such that they lie in the clearances between shoe 160 and vanes 158 and 156, respectively, the positions of ports 172 and 174 are just sufficiently removed from shoe 160 that they will be passed by vanes 156 and 158, respectively, as such vanes respectively complete an oscillation toward shoe 160.

Port 172 is serially connected through a conduit 178, a pressure relief valve 180 and a conduit 182 to conduit 166. Similarly, port 174 is serially connected through a conduit 184, a pressure relief valve 186 and a conduit 188 to conduit 164.

The apparent similarity to the arrangement of FIGURE 7 will be apparent. Thus each port 172 and 174 will normally communicate with the same pair of variable volume chambers as each conduit 166 and 164, respectively, with which the port is respectively connected through a valve 180 or 186. At the end of an oscillation of rotor 154, however, the port 172 or 174 passed by vane 156 or vane 158 as rotor 154 completes such stroke will communicate with a different pair of variable volume chambers than its associated conduit 166 or 164 to function as an exhaust port for such different chambers. Thus, in operation, pressure relief valves 180 and 186 are set to operate at a pressure lower than the pressure to be applied through conduit 166 or conduit 164. Thus, for example, when air pressure is applied to conduit 164, rotor 154 is driven to oscillate such that vane 156 moves along wall 152 towards shoe 160. Since the pressure in exhaust conduit 166 is also on conduit 182, valve 180 does not operate until vane 156 passes port 172, thereby placing port 172 in communication with the same chambers with which conduit 164 communicates. Valve 180 thereupon operates venting the pair of chamber parts pressured through conduit 164 into conduit 166. Likewise, when pressure is applied to conduit 166, valve 186 initially will not operate since the same pressure of conduit 164 is also on conduit 188. As vane 158 passes port 174, thereby placing port 174 in communication with the same pair of chambers with which conduit 166 communicates, valve 186 operates thus venting the chambers through conduit 184, valve 186 and conduit 188 into conduit 164.

Figure 10:
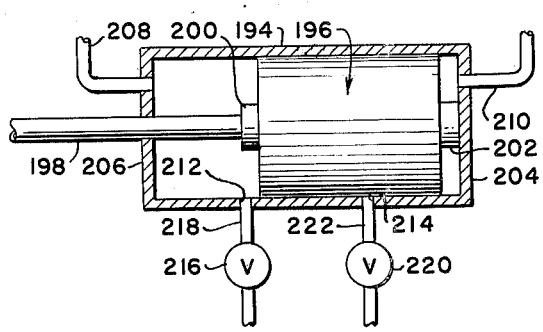
FIGURE 10 is a schematic representation of another embodiment of my invention.

In FIGURE 10, another arrangement in accordance with my invention is shown in which a cylinder 194 has a piston 196 mounted for reciprocation therein. Piston 196 is mounted on piston rod 198 and to which it is attached by nuts 200 and 202. As shown in the drawing, piston 196 is limited in one extreme position of movement when nut 202 and rod 198 bear against end wall 204 of cylinder 194. It will be understood, of course, that piston 196 is limited in its other extreme of movement when nut 200 bears against end wall 206 of cylinder 194. It will also be observed in this figure that the length of piston 196 in contact with the side wall of cylinder 194 is substantially greater than the path of travel of piston 196 between its two extreme positions. It will further be observed that piston 196 separates the space within cylinder 194 into a pair of variable volume sub-chambers. The first sub-chamber is confined between end wall 206 and piston 196 while the second sub-chamber is confined between end wall 204 and piston 196. Thus, the central portion of the side wall of cylinder 194 is common neither to the first nor the second sub-chamber. As can also be seen in FIGURE 10, a fluid conduit 208 communicates with the interior of cylinder 194 through end wall 206 thereof, such that it is in communication with the first sub-chamber. Similarly, another fluid conduit 210 also communicates with the interior of cylinder 194 through end wall 204 thereof such that it is in communication with the second sub-chamber. Cylinder 194 is also provided with a pair of ports 212 and 214 extending through the side wall of cylinder 194 such that port 212 communicates with the first sub-chamber when it is at its maximum volume and port 214 comunicates with the second sub-chamber when it is at its maximum volume. As further shown in the drawing, port 212 is connected to pressure relief valve 216 by means of conduit 218 while port 214 is connected to pressure relief valve 220 by means of conduit 222.

In operation valves 216 and 220 are set to operate at a lower pressure than the pressure being applied through conduit 208 or 210, and a pneumatic circuit such as that of FIGURE 5 is employed. Conduits 208 and 210 thus correspond to conduits 63 and 64 while valves 216 and 220 correspond to valves 71 and 72. Thus, when pressure is applied through conduit 208 to the first sub-chamber, the piston 196 is driven to its position as shown in FIGURE 10, thereby placing port 212 in communication with the first sub-chamber. Since the pressure of conduit 208 is now applied to valve 216 through conduit 218, valve 216 operates thereby venting the first sub-chamber. Similarly, when pressure is applied through conduit 210 to the second sub-chamber piston 196 moves toward end wall 206 of cylinder 194 and as the second sub-chamber approaches its maximum volume port 214 is placed in communication with the second sub-chamber. Thus, when the pressure of conduit 210 is applied to valve 220 through conduit 222, valve 220 operates thereby venting the second sub-chamber.

Figure 11:
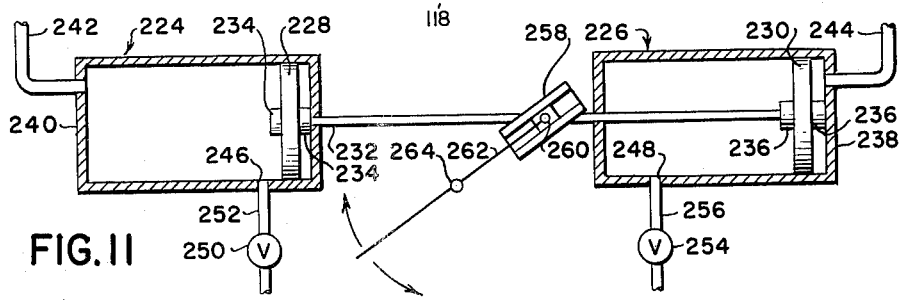
FIGURE 11 is a schematic representation of still another embodiment of my invention.

FIGURE 11 schematically illustrates another arrangement of my invention including two axially aligned cylinders 224 and 226 and two pistons 228 and 230 mounted for reciprocation within cylinders 224 and 226, respectively. Interconnecting pistons 228 and 230 is piston rod 232 attached to pistons 228 and 230 by means of nuts 234 and 236, respectively. As shown in the drawing, piston 230 is limited in one extreme position of movement when nut 236 and rod 232 bear against end wall 238 of cylinder 226. It will be understood, of course, that piston 228 is similarly limited in another extreme position of movement when nut 234 bears against end wall 240 of cylinder 224. It will be observed from this figure that a first variable volume sub-chamber is confined within cylinder 224 between end wall 240 thereof and piston 228. A second variable volume sub-chamber is also confined within cylinder 226 between the end wall 238 thereof and piston 230. As can be seen in FIGURE 11, a fluid conduit 242 communicates with the interior of cylinder 224 through end wall 240 thereof, such that it is in communication with the first sub-chamber. Similarly, another fluid conduit 244 communicates with the interior of cylinder 226 through end wall 238 thereof such that it is in communication with the second sub-chamber. Cylinder 224 is also provided with a port 246 extending through the side-wall of cylinder 224 such that port 246 communicates with the first sub-chamber when it is at its maximum volume. Cylinder 226 is similarly provided with a port 248 such that port 248 will communicate with the second sub-chamber when it is at its maximum volume. As further shown in the drawings, port 246 is connected to pressure relief valve 250 by means of conduit 252 while port 248 is connected to pressure relief valve 254 by means of conduit 256. Piston rod 232 is also provided with a channel box 258 pivotedly connected thereto intermediate cylinders 224 and 226. Disposed within box 258 is slide block 260. A lever arm 262 is schematically illustrated as having one end thereof connected to block 260 while some point of lever arm 262 intermediate the ends thereof passes through fulcrum 264.

In operation, pressure is applied to fluid conduit 242 driving piston 228 to the position shown in FIGURE 11. As piston 228 passes port 246 thereby placing port 246 in communication with the first sub-chamber, the pressure in fluid conduit 242 is applied to pressure relief valve 250 through conduit 252 thus causing valve 250 to operate and to vent the first sub-chamber. To return piston 228 to its extreme position of movement in which nut 234 bears against end wall 240, pressure is applied through conduit 244. In the same manner as just explained, piston 230 is driven from its position as illustrated in FIGURE 11 toward the opposite end of cylinder 226. As piston 230 passes port 248 thereby placing it in communication with the second sub-chamber, the pressure in conduit 244 causes pressure relief valve 254 to operate thereby venting the second sub-chamber. In the operation just described the reciprocating motion of pistons 228 and 230 and piston rod 238 is transmitted by means of channel box 258 and block 260 through lever arm 262 as rotary motion to fulcrum 264 at which point arm 262 is connected to the device to be actuated.

I claim:

1. In a vane type fluid actuated motor including means defining sectoral sides having internal confronting surfaces disposed in substantially parallel planes; arcuate wall means disposed between and interconnecting said sectoral sides and having an internal cylindrical surface with its axis normal to the planes of said sectoral sides; end wall means disposed between and interconnecting said sectoral sides and attached to and inwardly extending from said arcuate wall means and having a pair of intersecting internal partition surfaces cooperating with the internal surfaces of said arcuate wall means and sectoral sides to define a chamber of sectoral cross-section; a rotor located intermediate said sectoral sides rotatable upon an axle journaled in said sectoral sides adjacent the intersection of said end wall means, said rotor including said axle in sliding sealing contact with said sectoral sides and said intersection of said end wall means and a vane attached to said axle extending between and normal to the planes of said internal surfaces of said sectoral sides into said chamber in sliding sealing contact with said sectoral sides and arcuate wall means and rotatable with said rotor between a first position adjacent one of said pair of partition surfaces and a second position adjacent the other partition surface, thereby dividing said chamber into a pair of enclosed variable volume sub-chambers one said sub-chamber having its maximum and minimum volume at the first and second positions respectively of said rotor and vane and the other said sub-chamber having its maximum and minimum volume at the second and first positions respectively of said rotor and vane; and fluid conduit means communicating with each sub-chamber; the improvement which includes motor purge means comprising two parts through said vane and a normally closed valve across each said port, one valve being operable to open the port associated therewith at the first position of said rotor and vane and the other valve being operable to open the port associated therewith at the second position of said rotor and vane.

2. A fluid actuated motor according to claim 1 in which each said valve operates to open the port associated therewith by contact of the valve with the partition surface adjacent each said position.

References Cited by the Examiner

UNITED STATES PATENTS

| | | | |
|---|---|---|---|
| 330,494 | 11/1885 | Kimble | 92—121 |
| 491,141 | 2/1893 | Smith | 121—125 |
| 993,280 | 5/1911 | Stumpf | 121—125 X |
| 1,919,864 | 7/1933 | Salmen et al. | 121—44 |
| 2,181,754 | 11/1939 | White | 60—54.5 |
| 2,200,832 | 5/1940 | Bliss et al. | 121—135 |
| 2,261,444 | 11/1941 | Neubert | 91—401 |
| 2,368,628 | 2/1945 | Bates | 121—46.5 |
| 2,757,294 | 9/1957 | Smith | 121—38 X |
| 2,806,451 | 9/1957 | Vinkler et al. | 121—99 |

SAMUEL LEVINE, *Primary Examiner.*

KARL J. ALBRECHT, FRED E. ENGELTHALER,
*Examiners.*